Oct. 4, 1927.

H. C. BINKELE 1,644,630

HANDLE

Filed Feb. 20, 1926   2 Sheets-Sheet 1

Herman C. Binkele
INVENTOR

BY Victor J. Evans
ATTORNEY

WITNESS:

Oct. 4, 1927.
H. C. BINKELE
1,644,630
HANDLE
Filed Feb. 20, 1926    2 Sheets-Sheet 2
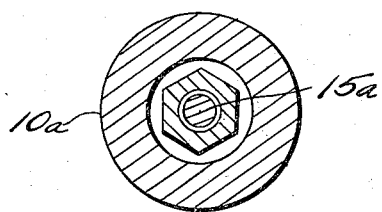
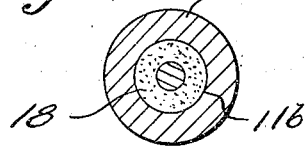
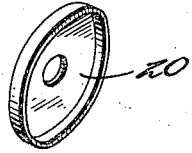
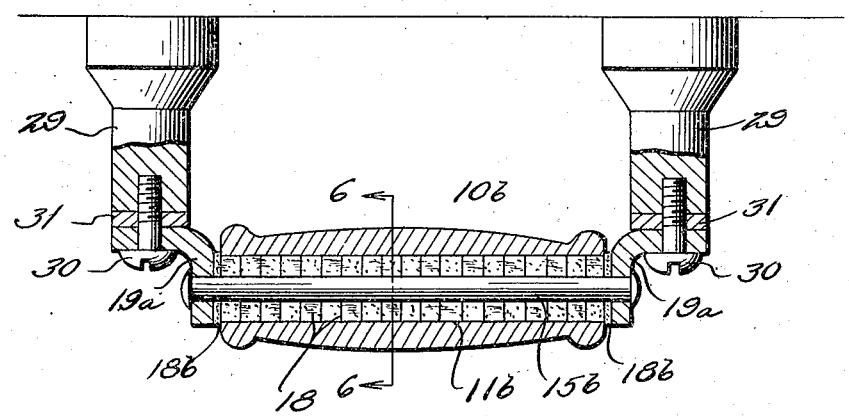
Herman C. Binkele
INVENTOR
BY *Victor J. Evans*
ATTORNEY
WITNESS:

Patented Oct. 4, 1927.

1,644,630

UNITED STATES PATENT OFFICE.

HERMAN CHRISTIAN BINKELE, OF TIGARD, OREGON.

HANDLE.

Application filed February 20, 1926. Serial No. 89,761.

This invention relates to handles especially designed for stoves, but also adapted for use in connection with other heated articles, an object being to provide a handle of novel construction, which will be effectually insulated from heat, so that it may be grasped without danger of burning.

Another object of the invention is the provision of a handle, which in addition to the above and other advantages, is of standard parts, so that it may be cheaply manufactured with its parts interchangeable and adapted to be assembled in various forms to suit conditions.

With the above and other objects in view, the invention further includes the following novel features and details of construction, to be hereinafter more fully described, illustrated in the accompanying drawings and pointed out in the appended claim.

In the drawings:—

Figure 4 is a section on the line 4—4 of Figure 3.

Figure 5 shows still another arrangement of handle.

Figure 6 is a section on the line 6—6 of Figure 5.

Figure 7 is a detail perspective view of one of the perforated heat insulating disks.

Figure 8 is a similar view of one of the flanged washers.

Figure 1:
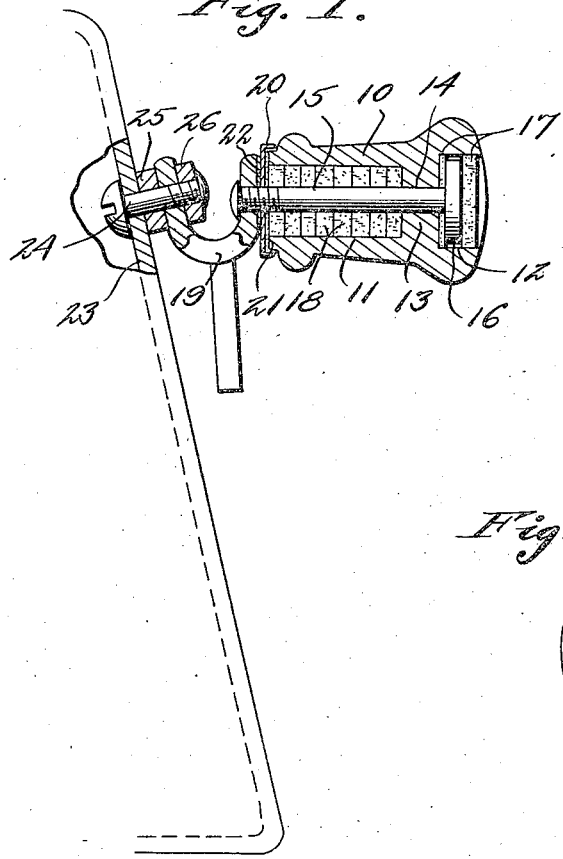
Figure 1 is a sectional view showing one arrangement of the handle.
Figure 2:
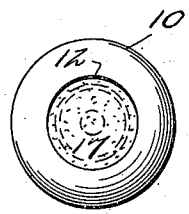
Figure 2 is an end view of the handle.
Figure 3:
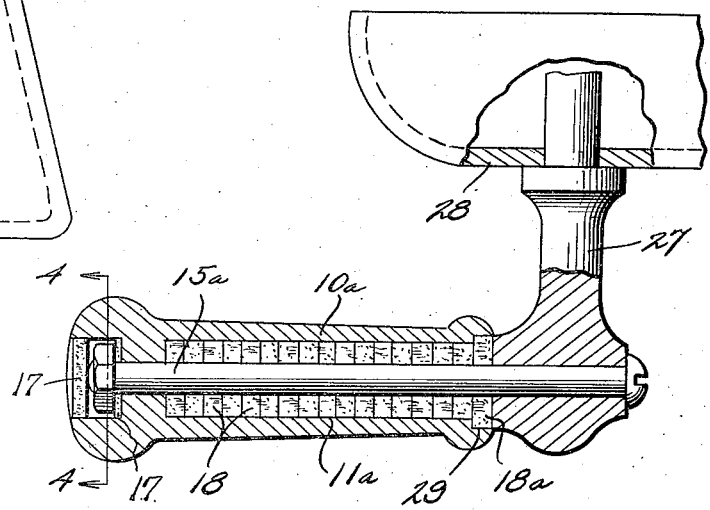
Figure 3 is a sectional view showing a different arrangement of handle.

Referring to the drawings in detail wherein like characters of reference denote corresponding parts, the reference characters 10, 10$^a$ and 10$^b$, shown respectively in Figures 1, 3 and 5 of the drawings, indicate the body portions of the handle which are preferably made of birch wood. It is of course understood that the handle may be made of other kinds of wood, or may be made of a suitable composition.

In Figure 1, the handle 10 is provided with a bore 11 which extends inwardly from one end, while its opposite end is provided with a recess 12, the material between the inner end of the bore and the inner end of the recess forming a partition 12 through which extends a relatively small opening 14. Extending through the handle within the opening 14 is a bolt 15, whose head 16 is positioned within the recess 12, while located within this recess upon opposite sides of the head 16 are insulating washers 17. One of these washers is perforated for the passage of the bolt.

Located within the bore 11 are heat insulating disks 18 which are provided with openings to receive the bolt 15. The disks 18 and the washers 17 are preferably formed of asbestos.

One end of the bolt extends beyond the body 10 and has a threaded engagement with an attaching member 19 which, as shown in Figure 1 of the drawings is substantially U-shaped. Positioned upon the bolt between the attaching member 19 and the adjacent end of the body 10 is a flanged washer 20. This washer is provided with an asbestos lining 21, while an asbestos washer 22 is positioned between the washer 20 and the adjacent portion of the attaching member.

The opposite end of the attaching member 19 is attached to a fire door or other member 23 by means of a bolt 24, the latter passing through the attaching member 19 and having mounted thereon an asbestos washer 25 and a securing nut 26.

In Figure 3, the body 10$^a$ is of substantially the same character as that illustrated in Figure 1. In Figure 3 however the body 10$^a$ is longer and is provided with a relatively long bore 11$^a$ within which is positioned the asbestos or heat insulating disks 18. These disks surround a bolt 15$^a$ which serves to secure the handle to a shank 27, which in turn is attached to a door or other member 28. In this figure a relatively large washer 18$^a$ is seated within a countersunk portion 29 provided in the member 10$^a$ and abuts the adjacent portion of the attaching member 27.

In Figure 5, the bore 11$^b$ extends entirely through the body 10$^b$ and is surrounded by the heat insulating washers 18. The bolt 15$^b$ has its ends extended beyond each end of the body 10$^b$ and is engaged with substantially L-shaped attaching members 19$^a$. Relatively large heat insulating washers 18$^b$ are provided at each end of the body 10$^b$. Spaced shanks or studs 29 which may be attached to a door or other object, have their outer ends attached to the members 19$^a$ by screws 30 and are insulated from said members by asbestos or similar washers 31.

The invention is susceptible of various changes in its form, proportions and minor details of construction and the right is herein reserved to make such changes as properly fall within the scope of the appended claim.

Having described the invention what is claimed is:—

A handle comprising a body having a central bore extending inwardly from one end, a recess at the opposite end and providing a partition between the bore and recess, said partition having a relatively small opening extending through the partition and opening into the bore and recess, a bolt extending through the body, spaced heat insulating disks within the recess to insulate the body from the end of the bolt, apertured heat insulating disks positioned throughout the length of the bore around the bolt, a substantially U-shaped attaching member, heat insulating means between the attaching member and body and heat insulating means between the attaching member and article to which the handle is attached.

In testimony whereof I affix my signature.

HERMAN CHRISTIAN BINKELE.